June 5, 1962 E. KÜHN 3,037,691

SHORT-CUT MULTIPLIER ENTRY MECHANISM

Filed Aug. 21, 1958 6 Sheets-Sheet 1

INVENTOR.

Eugen Kühn

BY Michael S. Striker

Attorney

June 5, 1962 E. KÜHN 3,037,691

SHORT-CUT MULTIPLIER ENTRY MECHANISM

Filed Aug. 21, 1958 6 Sheets-Sheet 2

INVENTOR.
Eugen Kühn
BY Michael S. Striker
Attorney

June 5, 1962 E. KÜHN 3,037,691

SHORT-CUT MULTIPLIER ENTRY MECHANISM

Filed Aug. 21, 1958 6 Sheets-Sheet 3

INVENTOR.

Eugen Kühn

BY

Michael S. Striker

Attorney

June 5, 1962 E. KÜHN 3,037,691

SHORT-CUT MULTIPLIER ENTRY MECHANISM

Filed Aug. 21, 1958 6 Sheets-Sheet 4

INVENTOR.

Jürgen Kühn

BY Michael S. Striker

Attorney

June 5, 1962 E. KÜHN 3,037,691

SHORT-CUT MULTIPLIER ENTRY MECHANISM

Filed Aug. 21, 1958 6 Sheets-Sheet 5

INVENTOR.

Eugen Kühn

BY Michael S. Striker

Attorney

June 5, 1962 E. KÜHN 3,037,691

SHORT-CUT MULTIPLIER ENTRY MECHANISM

Filed Aug. 21, 1958 6 Sheets-Sheet 6

INVENTOR.
Eugen Kühn

BY
Michael S. Striker
Attorney

3,037,691
SHORT-CUT MULTIPLIER ENTRY MECHANISM

Eügen Kühn, Oberndorf (Neckar), Germany, assignor to Olympia Werke A.G., Wilhelmshaven, Germany
Filed Aug. 21, 1958, Ser. No. 756,464
Claims priority, application Germany Aug. 22, 1957
18 Claims. (Cl. 235—60)

The present invention relates to a multiplication mechanism for calculating machines, and more particularly to an input mechanism for preparing a shortened multiplication.

Standard calculating machines effect a multiplication by repeated additions of the multiplicand which is introduced into the totalizer a number of times corresponding to the multiplier. For example, if the multiplier is 28, it is necessary to perform eight additions in the units order, and two additions in the tens order so that altogether ten additive operations have to be carried out.

It is also known to provide calculating machines with a mechanism capable of effecting shortened multiplication in which the multiplier 28 is transformed into 30 minus two so that in the units order two subtractive operations are effected, and in the tens order three additive operations are effected so that only five operations are necessary. In accordance with the known art, the multiplier is stored in register wheels which are successively shifted during the operation until the zero position is obtained. The digits between one and five are reduced by one unit during each additive operation, while the digits between six and nine are increased by one unit during each subtractive operation. When a register wheel passes from the position associated with the digit 9 to the position associated with the digit 0, a tens-transfer ot the next higher order takes place.

The U.S. Patent 1,968,201 discloses a mechanism of this type. A multiplier 10,928 is introduced into the multiplier register means, so that in the unit order two subtractive operations have to be carried out. During each subtractive operation in the units order the register means is moved to a position corresponding to an added unit so that after the first subtractive operation the number 10,929, and after the second operation the number 10,930 are registered, since during passage of the register wheel to zero position, a tens transfer to the tens order takes place. After the multiplicand pin carriage has moved to the position associated with the tens order of the multiplier, three additive operations are carried out in the tens order and during each additive operation, the respective stored digit is reduced by one unit so that after three operations the digit zero is registered in the second order. The further operations take place in a corresponding manner, so that at the termination of the multiplication zero is stored in the register means.

According to the devices of the known art, the multiplication must begin with the unit order of the multiplier to permit the tens-transfer in the multiplier register. This corresponds to a movement of the multiplicand pin carriage in a direction opposite to the direction of movement of the pin carriage during a division. Consequently, the pin carriage must be operable in two opposite directions.

It is one object of the present invention to provide an improved mechanism for effecting a shortened multiplication in a calculating machine.

It is another object of the present invention to provide in a calculating machine a mechanism for effecting a shortened multiplication in such a manner that the multiplicand pin carriage or a corresponding indexing means, moves during a shortened multiplication in the same direction as during a division.

It is consequently also an object of the present invention to provide a mechanism for effecting a shortened multiplication which requires only a single means for moving the pin carriage in one direction.

Another object of the present invention is to provide an input mechanism for effecting shortened multiplication by setting a series of digital input elements to positions representing the multiplier adjusted for a shortened multiplication.

Another object of the present invention is to actuate a denominational series of digital input elements in such a manner that whenever a digit in an order exceeds the digit 5, the input element of the next higher order is shifted to a position representing the next highest digit instead of the digit introduced into the respective next higher order.

Another object of the present invention is to preset the input elements in which the multiplier is stored during the introduction of the multiplier in such a manner that the shortened multiplication can be effected starting from the highest denominational order which corresponds to the sequence required for a division.

With these objects in view, the present invention mainly consists in an input mechanism for a calculating machine which is capable of effecting a shortened multiplication, the input mechanism comprising a denominational series of digital means, each digital means being shiftable between successive digital positions including a first group of digital positions associated with the digits of a group of lower digits and a second group of digital positions associated with the digits of a group of higher digits; a denominational series of digital input elements respectively associated with the digital means for moving the same to the digital positions; and a demoninational series of control elements respectively associated with the input elements. Each control element is connected to and operated by the digital means of the next lower order and controls the associated input element to move the digital means associated with the same to a position representing the next higher digit instead of the digit introduced into the respective input element only when the respective next lower order digital means is in a digital position of the second group.

When the calculating machine is designed for the decimal system, the group of lower digits preferably includes the digits from 0 to 5, and the group of higher digits includes the digits from 6 to 9.

In the preferred embodiment of the present invention, the input elements are restored to a normal home position spaced a unit distance beyond zero position after sensing the pin carriage. Coupling means connect each input element with the associated digital means, and when the coupling means are in coupling position, the respective digital means add a unit to the digit introduced in the respective order while the input element moves to the additional position. Each coupling means is controlled by a control means which is operated by the digital means of the next lower order to move the respective coupling means to an inoperative position when the respective lower order digital means is in a position representing one of the digits between 0 and 5.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
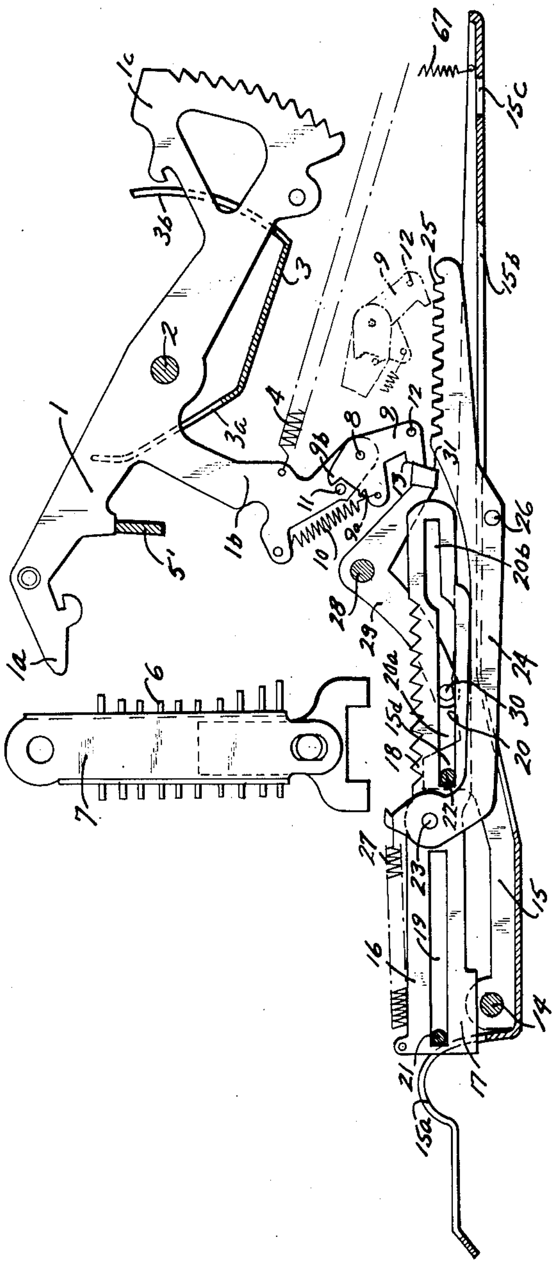
FIG. 1 is a fragmentary side view illustrating an embodiment of the present invention with certain parts of the mechanism omitted for the sake of clarity.
Figure 2:
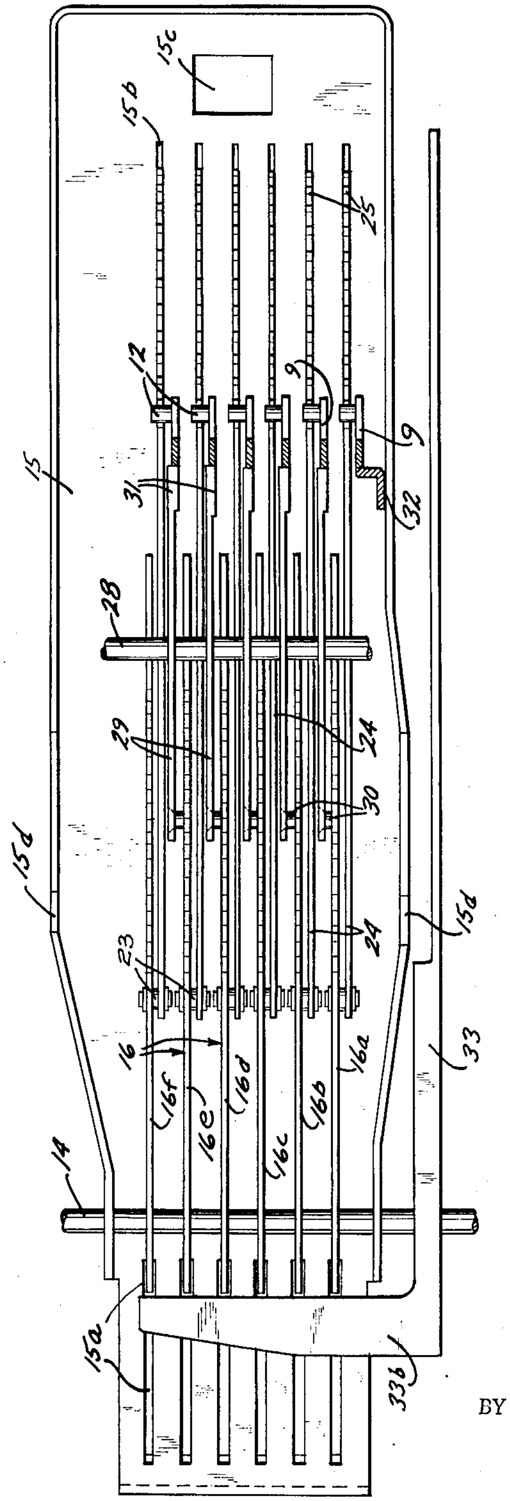
FIG. 2 is a fragmentary plan view of the embodiment of FIGURE 1 with certain parts omitted for the sake of clarity.

Referring now to the drawings, and more particularly to FIGS. 1 and 2, a denominational series of digital input actuator elements 1 are mounted for independent turning movement on a shaft 2 which is supported in the frame of the machine. The input elements 1 are guided in slots 3*a* and 3*b* of a guide means 3. Each input element has an arm 1*b* to which a spring 4 is secured which tends to turn the respective input element in counterclockwise direction so that the input elements 1 abut against a transverse bar 5' of an operating means 5 which is shown in greater detail in FIGURES 3 to 6. When the transverse member 5' releases the input elements 1, as shown in FIGURE 5, the input elements 1 turn in counterclockwise direction to sense the pins 6 of a pin carriage 7. The pin carriage 7 is of a conventional construction and includes a denominational series of rows of pins which are respectively associated with the digits from 0 to 9. Each row of pins is associated with one of the input elements 1, and when one of the pins 6 is in operative position, as shown for the digit 4 in FIG. 5, it engages the portion 1*a* of the respective input element 1 and blocks movement of the same. Each input element 1 is provided with a toothed portion 1*c* which may mesh with a gear for setting a printing means.

On the arm 1*b* of each input actuator element 1, a coupling member 9 is turnably mounted on a pin 8, and is urged by a spring 10 to turn in clockwise direction until the shoulder 9*a* thereon engages a stop means 11 on arm 1*b*. In the position illustrated in FIGURE 1, the coupling member 9 is blocked by a control lever 29, as will be described in greater detail hereinafter, so that spring 10 is tensioned, and a shoulder 9*b* engages the stop means 11. It will be noted that in the position of FIGURE 1, the portion 1*a* of the input element 1 is raised to a position located above the sensing positions of the input element. When an input element 1 is in a sensing position, the shoulder 9*a* will abut against the stop means 11, and the pin 12, which is fixed on the coupling member 9, will be in a lower position.

A guide member 15 is pivotally mounted on a shaft 14 and has a series of slots 15*a* in which slide elements 16 are guided for longitudinal movement when displaced from the position shown in FIG. 1. As best seen in FIG. 2, six slide elements 16*a* to 16*f* are provided. Slide element 16*a* is associated with the unit order, and slide element 16*f* is associated with the highest decimal order for which the machine is designed.

A lever element 24 is mounted on each slide element 16 by a pin 23, and is under the action of a spring 27 which tends to turn the respective lever element 24 in counterclockwise direction as viewed in FIGURE 1. Each slide element 16 and associated lever element 24 constitutes a digital slide means for storing a multiplier digit.

Each slide element 16 includes a projecting portion 17, and has eleven recesses 18 which form a toothed portion of the slide element.

Each slide element 16 has two longitudinally extending slots 19 and 20 through which two supporting rods 21 and 22 pass so that slide elements 16 are guided for longitudinal movement. During such longitudinal movement, each slide means moves to digital positions respectively associated with the digits from 0 to 9. A denominational series of control means 29 is mounted for independent turning movement on a supporting shaft 28, each control means 29 having a blocking projection 31 cooperating with a face 13 of the coupling lever 9 which is associated with the same order. Each control means 29 has at the other end thereof a pin 30 which is slidably guided in slot 20 of the slide element 16 associated with the next lower order as best seen in FIGURE 2.

Slot 20 of each slide element 16 is stepped and includes a first portion 20*a*, and a second offset portion 20*b*.

The relative position of the elements is such that pin 30 is in the slot portion 20*a* when the respective slide element 16 is in one of its digital positions associated with the digits 0 to 5, while pin 30 is located in the slot portion 20*b* when the respective slide element 16 is in a digital position associated with the digits from 6 to 9.

Consequently, when a slide element 16 represents one of the digits from 0 to 5 by its position, the blocking portion 31 of the respective control means 29 will be in the position illustrated in FIGURE 1 in which the respective coupling means 9 is blocked. However, when the pin 30 of a control means 29 is located in a slot portion 20*b*, the respective blocking portion 31 will be lowered and located outside of the path of movement of the respective coupling lever 9 so that spring 10 will turn the respective coupling lever 9 to a position in which shoulder 9*a* abuts against stop 11, even if the respective input actuator element 1 is in the raised position illustrated in FIGURE 1.

As best seen in FIGURE 2, the first control means 29 is associated with the second decimal order, and cooperates with the coupling means 9 which is mounted on the input actuator element 1 of the second decimal order. However, the pin 30 of the respective control means 29 projects into the slot 20 of the slide element 16*a* of the unit order.

The coupling means 9 which is mounted on the input actuator element 1 of the unit order, is not associated with a control means 29 and a stationary blocking means 32 is mounted on the frame of the machine which blocks the respective coupling means 9 in a manner corresponding to the operation of the control means 29.

As mentioned above, each slide means includes a lever element 24 which is guided in a slot 15*b* of the guide member 15. Each lever element 24 has ten recesses 25 which constitute a toothed portion thereon, and are engaged by associated coupling means 9 in coupling position as will be described hereinafter.

Each lever element 24 has a projecting pin 26 which engages guide member 15, so that all lever elements 24 are turned to an inoperative position against the action of spring 27 when the guide member 15 is turned in clockwise direction about shaft 14. Springs 27 tend to turn the associated lever elements 24 to operative positions in which they are engaged by associated coupling means 9 when the same are in coupling position.

Figure 3:
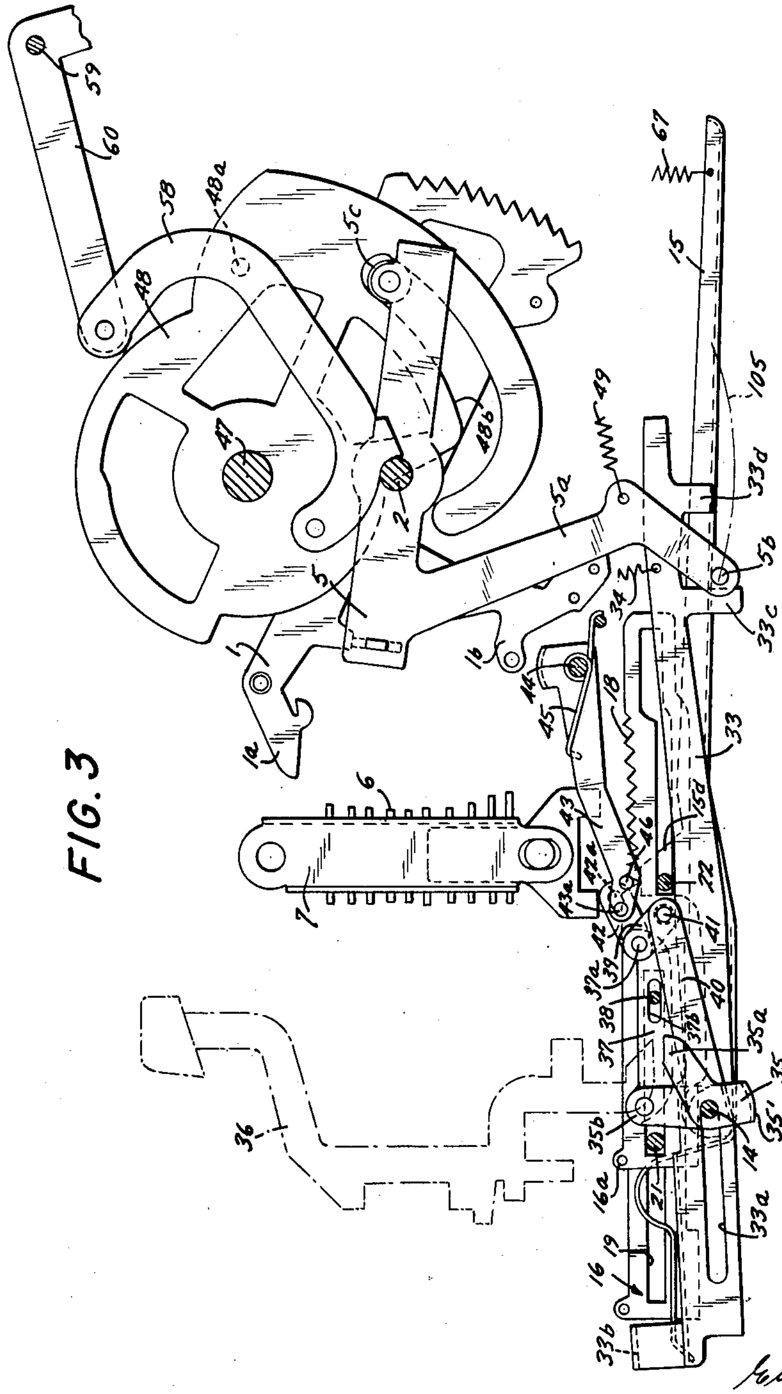
FIG. 3 is a side view of the mechanism illustrating a restoring device and the operation control means by which the cycles of the mechanism are effected.
Figure 4:
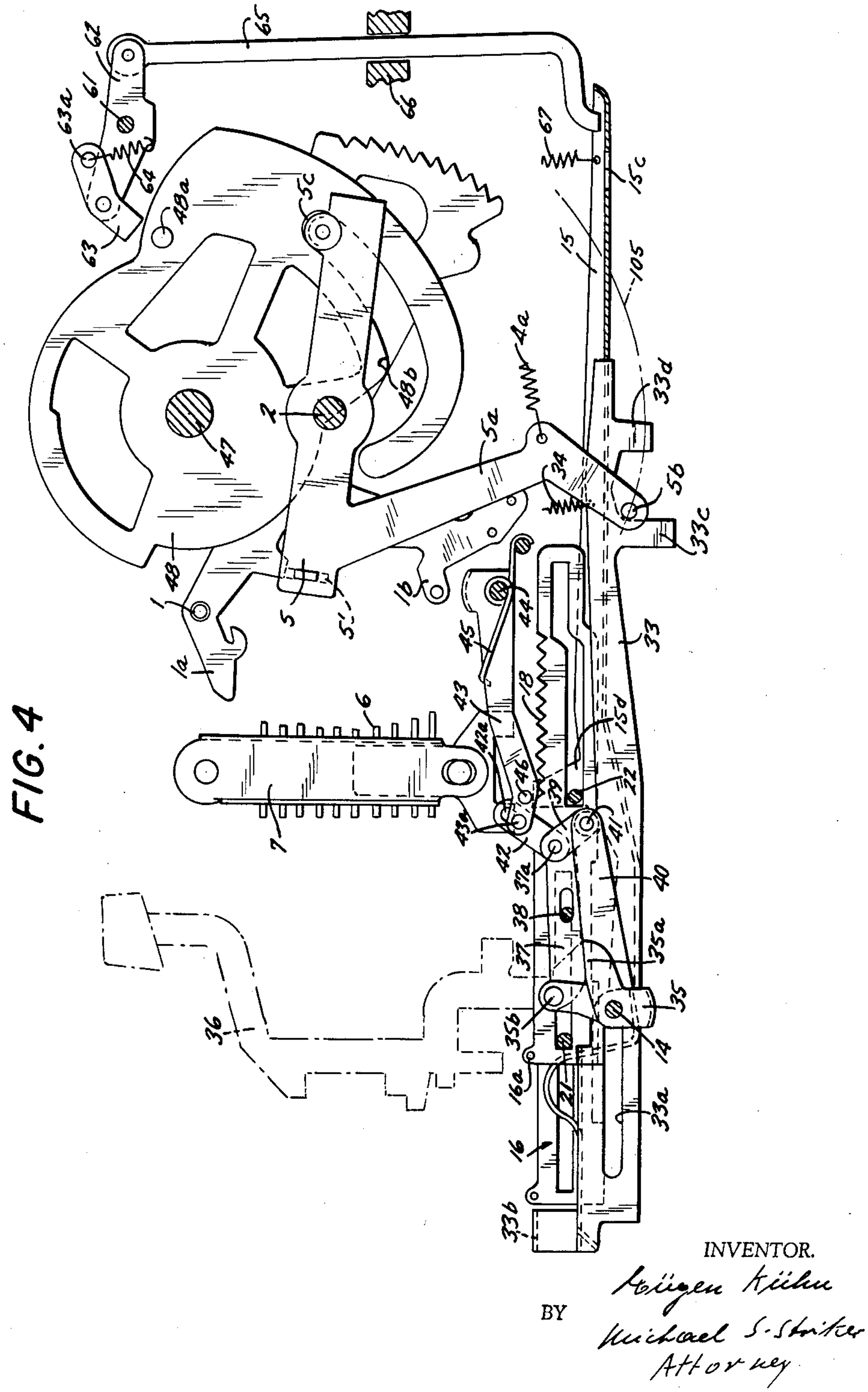
FIG. 4 is a side view corresponding to FIG. 3 but illustrating a different operational position of the elements.
Figure 5:
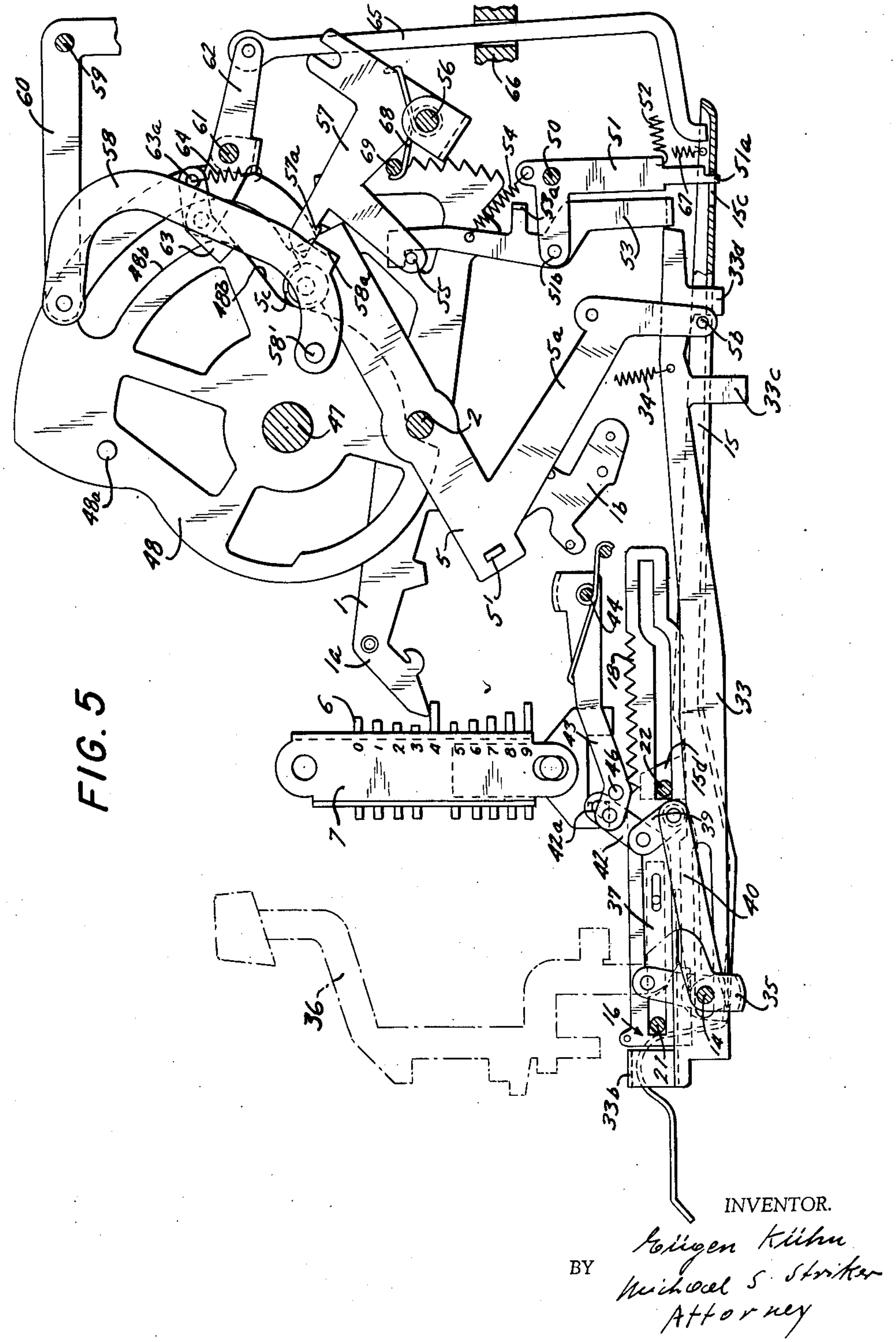
FIG. 5 is a side view of the mechanism illustrating another operational position.

As best seen in FIGURES 2, 3 and 4, a restoring and clearing means 33 is turnably mounted on shaft 14, and can be longitudinally shifted since shaft 14 passes through a longitudinal slot 33*a* of the restoring means 33. One end of restoring means 33 is formed by a transverse member 33*b* which extends across the ends of all slide elements 16. The longitudinal main portion of restoring means 33 has two projections 33*c* and 33*d*. A pin 5*b* projects transversely from arm 5*a* of member 5 into the space between projections 33*c* and 33*d* and a spring 34 is secured to the restoring means 33 and tends to turn the same in counterclockwised irection about shaft 14 into the position shown in FIGURE 3. It will be noted that in this position, the projection 33*d* is located outside of the path 105 along which pin 5*b* travels during turning movement of member 5 about shaft 2.

Shaft 14 also turnably supports a member 35 which has a transverse yoke portion 35', and two lateral portions 35*a* and 35*b*. Arm 35*a* is located under a projecting portion of the multiplication key 36 so that upon actuation of key 36, member 35 is turned in clockwise direction as viewed in FIGURES 3 and 4. A link 37, shown in broken lines in FIGURES 3 to 6 is articulated at one end thereof to arm 35*b*, and is supported for longitudinal movement on a stationary pin 38 which passes through a longitudinal slot 37*b* in link 37. A link 39 is pivotally connected by a pin 37*a* to link 37, and pivotally connected by a pin 41 to one end of another link 40 which is turnably mounted on shaft 14. The main portion of restoring means 33 abuts against pin 41 under the action of spring 34.

A link 42 is turnably connected to pin 37*a* and has a slot 42*a* into which a pin 43*a* on one arm of a U-shaped member 43 passes. Member 43 is turnably mounted on a stationary shaft 44, and is urged by a spring 45 to turn in counterclockwise direction. A transverse rod 46 extends between the two arms of member 43 and across the toothed portions 18 of all slide elements 16. In the initial position of FIGURE 3, spring 45 has turned arms 43 into a position in which rod 46 is located in recesses of the slide elements 16. Since recesses 18 of each slide element are associated with digital positions of the slide elements 16, rod 46 exactly determines the relative position of the slide elements and holds the slide elements against relative longitudinal displacement. Rod 46 performs the same function when slide elements 16 are in different positions for representing a number having different digits.

Guide member 15 has projections 15*d* which are located underneath rod 46 and support rod 46 under certain operational conditions to prevent engagement between rod 46 and recesses 18 as will be described hereinafter.

The main drive shaft 47 of the machine carries a cam means 48 which is part of the operation control means of the mechanism. Cam 48 has a cam slot 48*b* for guiding a cam follower roller 5*c* which is mounted on operating member 5. Cam slot 48*b* has a portion concentric with shaft 47, and a substantially radial portion so that during part of the turning movement of cam 48, operating member 5 is not influenced whereas operating member 5 is turned when cam follower roller 5*c* moves in the radial portion of slot 48*b*. Spring 49 acts on operating member 5 to urge cam follower roller 5*c* into slot 48*b*.

Figure 6:
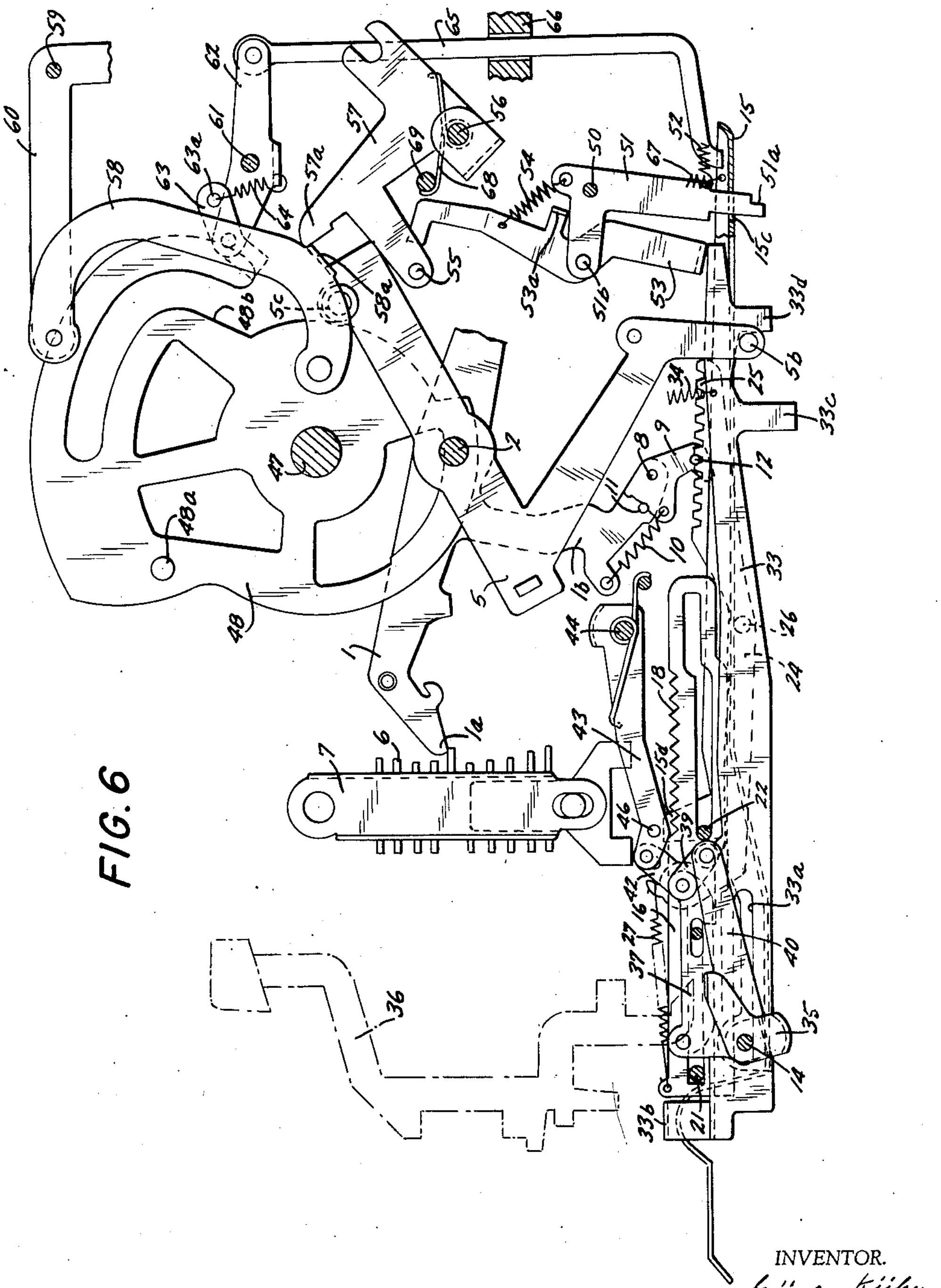
FIG. 6 is a side view of the mechanism illustrating a further operational position.

As shown in FIGURES 5 and 6, an arresting means 51 is turnably mounted on a shaft 50 and has an arresting portion 51*a* for arresting guide member 15. Portion 51*a* projects into a hole 15*c* in guide member 15, and has a shoulder arresting guide member 15 in the position of FIGURE 5 so that guide member 15 cannot turn in counterclockwise direction under the action of spring 67. When arresting means 51 is turned into the position shown in FIGURE 6, the arresting portion 51*a* passes through hole 15*c*, and guide member 15 is released for turning movement in counterclockwise direction into an operative position. Spring 52 is secured to arresting means 51 and urges the same into the arresting position shown in FIGURE 5. A transverse arm of arresting means 51 is articulated by pin 51*b* to a release lever 53 which is connected by a spring 54 to the main portion of arresting means 51.

Under the action of the spring 54, release lever 53 turns in clockwise direction until a projecting portion 53*a* of release lever 53 engages the transverse arm of arresting means 51 as shown in FIGURE 6.

The lower arm of release lever 53 cooperates with the restoring means 33, and the upper arm thereof has a hook-shaped end portion which engages a pin 55 of release member 57 in the position of the mechanism shown in FIGURE 5 in which the end portion of restoring means 33 engages release lever 53.

Release member 57 is turnably mounted on a shaft 56 and is urged by a spring 68 to turn in counterclockwise direction until it abuts against a stop 69.

Release member 57 is controlled by portion 58*a* of a link member 58 which is turnably mounted on cam 48 by means of a pin 58'. The other end of link member 58 is articulated to a lever 60 which is mounted for turning movement about a stationary supporting pin 59.

A double-armed lever 62 is turnably mounted on a supporting shaft 61, and carries on one arm thereof a latch lever 63 which is connected by a spring 64 to lever 62 so that pin 63*a* abuts against lever 62. The other arm of lever 63 is located in the circular path of movement of a pin 48*a* which is secured to cam 48.

An operating rod 65 is articulated to the other arm of lever 62 and guided in a stationary guide member 66 for movement in longitudinal direction thereof. The free end of rod 65 cooperates with guide member 15 so as to turn guide member 15 from the position shown in FIGURE 4 to the position shown in FIGURE 5 when lever means 62, 63 is turned by cam pin 48*a* in clockwise direction. As explained above, spring 67 tends to turn guide member 15 into the position shown in FIGURE 4 in which the projections 15*d* raise rod 46 out of the recesses 18. When operating rod 65 lowers the end portion of guide member 15, arresting means 51, 51*a* arrests guide member 15 in the position illustrated in FIGURE 5.

The above described input mechanism operates in the following manner:

A number is introduced into the pin carriage 7 by operation of the ten number keys of the machine so that, starting with the highest order, pins 6 representing associated digits are successively moved to an operative position as shown in FIGURE 5 for the pin associated with the digit 4.

Thereupon, the multiplication key 36 is actuated, and engages portion 35*a* of member 35 which turns from the position shown in FIGURE 3 to the position shown in FIGURE 4. Link 37 moves to the right as viewed in FIGURE 3 so that the toggle lever means 39, 42 is straightened whereby pin 43*a* is raised and lever 43 is turned in clockwise direction against the action of spring 45 resulting in raising of rod 46. Rod 46 releases the recesses 18 of slide elements 16 which were blocked by rod 46 in the initial position of FIGURE 3.

While pin 43*a* and rod 46 are raised by the operation of the multiplication key 36 through the linkage means 37, 39 and 42, pin 41 is lowered. Since pin 41 abuts against the top face of restoring means 33, restoring means 33 is turned against the action of spring 34 about shaft 14, so that projection 33*d* is now located in the circular path 105 of pin 5*b* as shown in FIGURE 4.

Multiplication key 36 closes in a conventional manner a switch by which the motor of the machine is started. Cam means 48 turns with the drive shaft in counterclockwise direction through a predetermined angle. During this part of the operational cycle, cam pin 48*a* engages lever 63 and turns lever 62 in clockwise direction so that operating rod 65 turns guide member 15 in clockwise direction against the action of spring 67 into the position shown in FIGURES 1 and 5 so that arresting means 51 snaps from the releasing position shown in FIGURE 6 into the arresting position shown in FIGURE 5 and arrests guide member 15.

As explained above with reference to FIGURE 1, each lever element 24 of a slide means 16, 24 has a transverse projecting pin 26 engaging guide member 15. Consequently, when guide member 15 is turned from the position shown in FIGURE 1 to the position shown in FIGURE 5, all lever elements 24 are turned in clockwise direction about pins 23 from the operative position shown in FIGURE 1 to an inoperative position in which toothed portions 25 of lever elements 24 are spaced from coupling levers 9. Members 24 and 9 are not shown in FIGURE 5 so that the inoperative position of lever elements 24 is not illustrated.

At this point of the operation, a number, introduced during a preceding operation into the slide means 16, 24, might still be stored in slide means 16, 24 so that the slide means are displaced relative to each other in accordance with the digits represented by the same. Consequently, the slide means have to be cleared and restored to initial position before a new multiplier is introduced. Slide means 16, 24 are now ready for a clearing operation, since rod 46 was raised out of recesses 18 by operation of the multiplication key, and the coupling means 9 were separated from the recesses 25 of the lever elements 24 by lowering lever elements 24 to inoperative positions by guide member 15 under control of elements 65, 62, 63 and 48_a_.

During the first part of the turning movement of cam 48 which resulted in actuation of the guide member 15, cam follower roller 5_c_ moves in the portion of slot 48_b_ which is concentric with the axis of cam 48. Consequently, operating means 5 was not influenced. During further turning of cam means 48 in counterclockwise direction, cam follower roller 5_c_ passes into the almost radial second portion of slot 48_b_ so that operating means 5 is actuated to turn from the position shown in FIGURE 4 to the position shown in FIGURE 5. Since restoring means 33 was preset by operation of multiplication key 36, pin 5_b_ engages projection 33_d_ during turning movement of operating means 5 and shifts restoring means 33 from the position shown in FIGURE 4 to the position shown in FIGURE 5. It will be noted that in the position of FIGURE 4 slide element 16_a_ is in zero position, while one of the other slide members 16 is shown in a displaced position representing a digit and projecting to the left beyond the end of slide element 16_a_. Such previously displaced slide means 16, 24 are restored to initial position as shown in FIGURE 5 by the transverse portion 33_b_ of the restoring means 33. At this point of the operation, all slide means 16 are cleared and ready to store the new multiplier already stored in the pin carriage 7.

In the position of FIGURE 1, the input actuator elements 1 are supported by the transverse portion 5' of operating means 5. In the position of FIGURE 5, however, portion 5' is lowered since operating means 5 has turned, and consequently all input actuator means 1 are released and turned under the action of springs 4 in counterclockwise direction to digital sensing positions abutting against operative pins 6 of the pin carriage 7. The input actuator elements may be in different digital positions, since different digits may have been introduced into the pin carriage. Consequently, the coupling levers 9 are also differently displaced with respect to the toothed portions 25 of the lever elements 24. FIGURE 1 shows in dash and dot lines a coupling lever 9 whose associated input actuator element 1 has sensed a pin 6 representing the digit 9 in the respective order. Since in FIG. 5 the pin 6 representing the digit 4 is shown in operative position, the input actuator element 1 assumes a corresponding digital sensing position in which its coupling lever 9 is located opposite a recess 25 associated with the digit 4. These elements, however, are not shown in FIGURE 5.

At this point of the operation, the input elements 1 are in sensing positions, the coupling levers 9 are correspondingly set, and the restoring means 33 arrive in a terminal position engaging release lever 53 which turns in counterclockwise direction until its hook-shaped end portion engages pin 55 of release member 57. Cam 48 turns with member 58 until portion 58_a_ engages portion 57_a_ of release member 57 and turns release member 57 in clockwise direction so that pin 55 raises release lever 53 and thereby turns arresting means 51 from the position illustrated in FIGURE 5 to the position illustrated in FIGURE 6 in which guide member 15 is released and rises under the action of spring 67 to an operative position in which its projecting portions 15_d_ hold transverse rod 46 in raised inoperative position. At the same time, lever elements 24 are free to turn under the action of springs 27 to operative positions in which the toothed portions 25 engage the associated coupling means 9. Such movement of lever elements 24 is possible, since pins 26 follow guide member 15 to its higher operative position.

At this point of the operation, the input elements 1 are in sensing position and coupled to the associated slide means 16, 24 by coupling levers 9. The first part of the oscillating movement of cam 48 is now terminated, and multiplication key 36 is now released in a conventional manner. However, rod 46 is supported by projections 15_d_ of guide member 15, and consequently cannot block the slide elements 16 as in the position of FIGURE 3 before actuation of the multiplication key 36.

During the second part of the operational cycle, cam 48 turns in opposite clockwise direction through the same angle as during the first part of the operation cycle. Cam follower roller 5_c_ moves along the radial portion of slot 48_b_ so that transverse member 5' successively engages all input elements 1 and turns the same in clockwise direction to the position shown in FIGURE 1. At the same time, pin 5_b_ engages projection 33_c_ of restoring means 33, and moves restoring means 33 to the position shown in FIGURE 3.

The operating means 5 raise input actuator elements 1 to an additional position located beyond the digital position associated with the digit zero and with the respective zero pins 6 of the pin carriage 7.

Pins 12 of coupling means 9 are located in corresponding recesses 25 of lever elements 24 during such movement of the input actuator elements 1, so that the slide means 16, 24 are moved to the left as viewed in the drawing. The displacement of each slide means 16, 24 depends on the turning angle of the associated input actuator element 1 which is determined by the angle between the sensing position of the respective input actuator element 1, and the above described additional position. Consequently if the control means 29 were not provided, all slide means 16, 24 would be moved to digital positions representing not the digits introduced into the pin carriage and sensed by the input actuator elements 1, but each slide means would represent the digit introduced in the pin carriage in the respective order augumented by a unit. For example, if the digit 2 were stored in an order of the pin carriage, the respective slide means would be in a position representing the digit 2 when the respective input actuator elements is in the zero position, but will move to a digital position representing the digit 3 during movement of the respective input actuator element 1 to the additional position located beyond the zero position.

If one of the digits from zero to five is introduced into the slide means 16, 24, pin 30 of the respective control means 29 will be located in the slot portion 20_a_, and the blocking portion 31 of control means 29 will be located in the path of coupling means 9 associated with the next higher order. The positions of the blocking portions 31 are such that blocking portion 31 engages coupling lever 9 when the associated input actuator element 1 passes through the zero position. Consequently, after coupling means 9 has shifted the associated slide means 16, 24 a distance corresponding to the sensed digit, the blocking portion 31 will engage the respective coupling means 9 and turn the same to the position illustrated in FIGURE 1 in which pin 12 has released the respective recess 25 so that the respective slide means 16, 24 will not move any further during the additional movement of the respective input actuator element 1 from the zero position to the additional position shown in FIGURE 1.

Consequently, when a digit from zero to 5 is registered in the slide means of any order and pin 30 is located in the slot portion 20_a_, the coupling means 9 of the next higher order will be moved by blocking portion 31 to an inoperative position, and the respective slide means of such next higher order will be moved to a digital position representing the digit introduced in the respective next higher order of the pin carriage. This is desired for a shortened multiplication, since the digits from zero to 5 require not more than five additive operations.

However, when pin 30 of a control means 29 is located in the slot portion 20*b* of the slide element 16 associated with the next lower order, this means that in the respective next lower order a digit between 6 and 9 is registered, and in this event, the blocking portion 31 will be inoperative, and the respective coupling means associated with the next higher order will move with the respective input actuator element 1 of the next higher order while being coupled by pin 12 to the respective slide means 16, 24 of the next higher order. Consequently during movement of the respective input actuator element 1 to its additional position, the slide means of such next higher order will be moved to the next following digital position, and represent instead of the digit introduced in the respective next higher order, the respective digit augmented by one. This constitutes a multiplication by ten so that in the respective next lower order the difference between 10 and the introduced digit has to be subtracted, instead of added. For example, if the digit 8 has been introduced into the slide means of an order, only two subtractive operations have to be carried out in the respective order, since the next higher order represents already a multiplication by ten.

Assuming that a multiplier 684 was introduced into the pin carriage 7, the slide means 16, 24 will not store the same number after the above described operations have been carried out, but will represent the number 1784. Slide means 16*a* of the unit order will be moved four steps to represent the digit 4, slide means 16*b* of the second order will be moved eight steps, slide means 16*c* of the third order will be moved seven steps corresponding to the introduced digit 6 augmented by a unit, and slide means 16*d* of the fourth order will be moved one step corresponding to zero in the fourth order of the introduced number augmented by one unit.

During this operation, the multiplier introduced into the pin carriage has been transferred into the series of slide means 16 and modified to represent the multiplier in the form required for a shortened multiplication.

In the illustrated embodiment, a multiplier having five orders can be introduced and the sixth slide element is only used if the highest order of the multiplier contains a digit higher than five.

Since the digit of the units order is never augmented by one, coupling means 9 of input actuator element 1 of the unit order cooperates with a stationary stop 32 as shown in FIG. 2, so that the respective coupling means 9 of the unit order is always moved to inoperative position during movement of the respective input actuator of element 1 to its additional position.

It is apparent that slide element 16*a* of the units order has to perform up to nine steps, slide element 16*b* has to perform up to ten steps, and slide element 16*f* has to perform either no steps or one step only.

At the end of the second part of an operational cycle of cam 48, cam pin 48*a* engages latch lever 63 which resiliently yields to permit passage of pin 48*a* without actuation of lever 62. Member 58 also returns to its original position and permits return of release member 57 under the action of spring 68.

After the multiplier and the multiplicand have been introduced into the machine, a multiplication key is actuated so that the calculating operations are automatically performed by the machine. As explained above, additive and subtractive operations may be required for carrying out the shortened multiplication, and the means for performing these calculating operations are known and are not an object of the present invention. The slide element 16 may be provided with rack portions acting on the gears of a counting mechanism during movement of the slide means from the right to the left as viewed in FIG. 1. The counting mechanism controls the number of operations and is turned in one direction during additions, and in the opposite direction during subtractions until it arrives in zero position in which the multiplicand has been added as many times as required by the multiplier. A revolution counter as described in the U.S. Patent No. 1,968,201 may be used but it is not necessary to provide tens-transfer means in the revolution counter used with the apparatus of the present invention, since the slide means of the present invention represent the multiplier in adjusted form required for shortened multiplication.

At the beginning of the next following operational cycle of the machine, pin 48*a* engages lever means 63, 62 and operates rod 65 to turn guide member 15 to its inoperative position in which it is arrested by arresting means 51. This position of guide member 15 is shown in FIG. 3. The projections 15*d* of guide member 15 release the rod 46, which engages the respective recesses of slide element 16 and holds the same in the digital position representing the multiplier. At the same time lever elements 24 are turned and move to inoperative position and release pins 12 of coupling means 9.

The following movements of the operating means 5 have no influence on the restoring means 33 during the computing operation since the multiplier key 36 is not actuated so that restoring means 33 remains in the position shown in FIG. 3.

In this position of the restoring means 33, pin 5*b* of operating means 5 will not engage projection 33*d* of restoring means 33, so that the slide means 16, 24 are not cleared until the multiplier key is again operated. Since it is not necessary to operate the multiplier key while the additive and subtractive operations of a shortened multiplication are performed, the lever elements 24 are locked in an inoperative position by the guide member 15 in which the movements of the actuator elements 1 and of the respective coupling means 9 have no effect on the slide means, since the coupling means 9 slide on the toothed portions 25 of lever elements 24.

When it is desired to introduce a new multiplier into the slide means 16, 24, the multiplier key 36 is again actuated whereby the slide means 16, 24 are cleared by the restoring means 33.

A particular advantage of the mechanism of the present invention resides in that the control means 29 are positively controlled by slots 20 so that a movement of movable parts beyond the correct position is not possible as is the case with conventional tens-transfer devices.

The means by which the calculating machine is set to perform additive or subtractive operations as required by a shortened multiplication, are not an object of the present invention. Slide means 16, 24 in digital positions associated with the digits from zero to five may control calculating devices to perform additive operations, and slide means in digital positions associated with the digits from six to nine may control the calculating devices to perform subtractive operations. Otherwise, the slide means may control a revolution counter as explained above.

The mechanism of the present invention permits an operation in which the multiplier controls multiplication starting with the highest order so that the multiplicand pin carriage moves in the same direction as required for the division which is a considerable advantage over devices which require movement of the pin carriage in the direction from the lowest order to the highest order during multiplication.

It will be understood that each of the elements described above, or two or more together may also find a useful application in other types of apparatus for effecting shortened mutiplication differing from the types described above.

While the invention has been illustrated and described as embodied in an input mechanism for preparing shortened multiplications, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a calculating machine, in combination, a multiplier input mechanism for shortened multiplications and comprising a denominational series of digital input actuator elements respectively movable from a normal home position spaced a unit distance beyond zero position to a selected one of a set of digital positions 0–9 and restored to home position during an operational cycle of said elements; a denominational series of digital means, each digital means being movable through a series of successive digital positions including a first group of digital positions associated with the digits of a group of lower digits and a second group of digital positions associated with the digits of a group of higher digits; a denominational series of coupling means respectively movable between an inoperative uncoupled position and a coupling position, each coupling means in said coupling position connecting an input actuator element with the corresponding digital means during movement of the input actuator element in one direction so that during each operational cycle of said input actuator elements said digital means are shifted to digital position corresponding to respective input actuator elements; and a denominational series of control elements, each control element co-operating with the coupling means of the same order, and being connected to and operated by the digital means of the next lower order to assume an operative position when the same is in a position of said first group and to assume an inoperative position when the same is in a position of said second group, each control element in said operative position shifting the corresponding coupling means to said inoperative position of the same during movement of the respective input actuator element from zero to home position so that only upon introduction of said higher digits into any digital means the coupling means of the next higher order remains in said coupling position whereby during movement of the respective input actuator element to said home position, the digital means associated with the next higher order is shifted to a position representing the next higher digit instead of the digit represented by the input actuator element associated therewith.

2. In a calculating machine, in combination, a multiplier input mechanism for shortened multiplications and comprising a denominational series of digital input actuator elements respectively movable from a normal home position spaced a unit distance beyond zero position to a selected one of a set of digital positions 0–9 and restored to home position during an operational cycle of said elements; a pin cirriage; operating means for moving said input actuator elements to sensing positions sensing said pin carriage so that said input actuator elements assume said digital positions, and for moving said input actuator elements from said digital positions to said normal home positions; a denominational series of digital means, each digital means being movable through a series of successive digital positions including a first group of digital positions associated with the digits of a group of lower digits and a second group of digital positions associated with the digits of a group of higher digits; a denominational series of coupling means respectively movable between an inoperative uncoupled position and a coupling position, each coupling means in said coupling position connecting an input actuator element with the corresponding digital means during movement of the input actuator element in one direction so that during each operational cycle of said input actuator elements said digital means are shifted to digital positions corresponding to respective input actuator elements; and a denominational series of control elements, each control element co-operating with the coupling means of the same order, and being connected to and operated by the digital means of the next lower order to assume an operative position when the same is in a position of said first group and to assume an inoperative position when the same is in a position of said second group, each control element in said operative position shifting the corresponding coupling means to said inoperative position of the same during movement of the respective input actuator element from zero to home position so that only upon introduction of said higher digits into any digital means the coupling means of the next higher order remains in said coupling position whereby during movement of the respective input actuator element to said home position, the digital means associated with the next higher order is shifted to a position representing the next higher digit instead of the digit sensed by the input actuator element associated therewith.

3. In a calculating machine, in combination, a multiplier input mechanism for shortened multiplications and comprising a denominational series of digital input actuator elements respectively movable from a normal home position spaced a unit distance beyond zero position to a selected one of a set of digital positions 0–9 and restored to home position during an operational cycle of said elements; a denominational series of digital means, each digital means being movable through a series of successive digital positions including a first group of digital positions associated with lower digits and a second group of digital positions associated with higher digits; a denominational series of coupling means respectively mounted for movement on said input actuator elements movable between an inoperative uncoupled position and a coupling position, each coupling means in said coupling position connecting the respective input actuator element with the corresponding digital means during movement of the input actuator element in one direction so that during each operational cycle of said input actuator elements said digital means are shifted to digital positions corresponding to respective input actuator elements; and a denominational series of control elements, each control element co-operating with the coupling means of the same order, and being connected to and operated by the digital means of the next lower order to assume an operative position when the same is in a position of said first group and to assume an inoperative position when the same is in a position of said second group, each control element in said operative position shifting the corresponding coupling means to said inoperative position of the same during movement of the respective input actuator element from zero to home so that only upon introduction of said higher digits into any digital means the coupling means of the next higher order remains in said coupling position whereby during movement of the respective input actuator element to said home position, the digital means associated with the next higher order is shifted to a position representing the next higher digit instead of the digit represented by the input actuator element associated therewith.

4. In a calculating machine, in combination, a multiplier input mechanism for shortened multiplications and comprising a denominational series of digital input actuator elements respectively movable from a normal home position spaced a unit distance beyond zero position to a selected one of a set of digital positions 0–9 and restored to home position during an operational cycle of said elements; a pin carriage; operating means for moving said input actuator elements to sensing positions sensing said pin carriage so that said input actuator elements assume said digital positions, and for moving said input actuator elements from said digital positions to said normal home positions; a denominational series of digital means, each digital means being movable through a series of successive digital positions including a first group of digital positions associated with the digits from zero to five and a second group of digital positions associated with the digits from six to nine; a denominational series of coupling means respectively movable between an inoperative uncoupled position and a coupling position, each coupling means in said coupling position connecting an input actuator element with the corresponding digital means during movement of the input actuator element in one direction so that during each operational cycle of said input actuator elements said digital means are shifted to digital positions corresponding to respective input actuator elements; and a denominational series of control elements, each control element co-operating with the coupling means of the same order, and being connected to and operated by the digital means of the next lower order to assume an operative position when the same is in a position of said first group and to assume an inoperative position when the same is in a position of said second group, each control element in said operative position shifting the corresponding coupling means to said inoperative position of the same during movement of the respective input actuator element from zero to home position so that only upon introduction of said higher digits into any digital means the coupling means of the next higher order remains in said coupling position whereby during movement of the respective input actuator element to said home position, the digital means associated with the next higher order is shifted to a position representing the next higher digit instead of the digit sensed by the input element associated therewith.

5. In a calculating machine, in combination, a multiplier input mechanism for shortened multiplications and comprising a denominational series of digital input actuator elements respectively movable from a normal home position spaced a unit distance beyond zero position to a selected one of a set of digital positions; a denominational series of digital means, each digital means being movable through a series of successive digital positions including a first group of digital positions associated with lower digits and a second group of digital positions associated with higher digits; a denominational series of coupling means respectively mounted on said input actuator elements for pivoted movement between an inoperative uncoupled position and a coupling position, said coupling means being spring-loaded and tending to assume said coupling position, each coupling means in said coupling position connecting an input actuator element with the corresponding digital means during movement of the input actuator element in one direction so that during each operational cycle of said input actuator elements said digital means are shifted to digital positions corresponding to respective input actuator elements; and a denominational series of control elements, each control element co-operating with the coupling means of the same order, and being connected to and operated by the digital means of the next lower order to assume an operative position when the same is in a position of said first group and to assume an inoperative position when the same is in a position of said second group, each control element in said operative position engaging the corresponding 1 coupling means during movement of the respective input actuator element to said normal home position for shifting the associated coupling means to said inoperative position of the same during movement of the respective input actuator element from zero to home position so that only upon introduction of the higher digits into any digital means the coupling means of the next higher order remains in said coupling position whereby during movement of the respective input actuator element to said home position, the digital means associated with the next higher order is shifted to a position representing the next higher digit instead of the digit represented by the input actuator element associated therewith.

6. In a calculating machine, in combination, a multiplier input mechanism for shortened multiplications and comprising a denominational series of digital input actuator elements respectively movable from a normal home position spaced a unit distance beyond zero position to a selected one of a set of digital positions 0–9 and restored to home position during an operational cycle of said elements and adapted to sense a pin carriage so as to assume said digital positions; a denominational series of digital slide means, each digital slide means being movable through a series of successive digital positions including a first group of digital positions associated with lower digits and a second group of digital positions associated with higher digits, each slide means having a stepped slot having a first slot portion associated with said first group of positions and an offset second slot portion associated with second group of positions; a denominational series of coupling means respectively mounted on said input actuator elements movable between an inoperative uncoupled position and a coupling position and tending to assume said coupling position, each coupling means in said coupling position connecting an input actuator element with the corresponding slide means during movement of the input actuator element in one direction so that during each operational cycle of said input actuator elements said slide means are shifted to digital positions corresponding to respective input actuator elements and a denominational series of movable control elements, each control element cooperating with a coupling means of the same order, and having a pin slidable in said stepped slot of the slide means of the next lower order and located in said first slot portion when the respective slide means is in a position of said first group and in said second slot portion when the respective slide means is in a position of the second group so that each control element assumes an operative position when the respective slide means is in a position of said first group and assumes an inoperative position when the respective slide means is in a position of said second group, each control element in said operative position engaging the corresponding coupling means during movement of the respective input actuator element from zero to home position for shifting said coupling means to said inoperative position of the same during movement of the respective input actuator element from zero to home position so that only upon introduction of the higher digits into any slide means the coupling means of the next higher order remains in said coupling position whereby during movement of the respective input actuator element to said home position, the slide means associated with the next higher order is shifted to a position representing the next higher digit instead of the digit sensed by the input actuator element associated therewith.

7. An input mechanism as set forth in claim 6 wherein each of said coupling means includes a coupling lever pivotally mounted on the respective associated input actuator element, stop means on the respective actuator element arresting said coupling lever in said coupling position, and spring means connecting the respective actuator element with said lever and urging the latter into said coupling position.

8. An input mechanism as set forth in the claim 7 wherein each of said slide means includes a slide element mounted for movement in longitudinal direction between said digital positions and having said stepped slot, and a lever element pivotally mounted on said slide element and having a toothed portion engaged by the respective coupling lever in said coupling position, said lever element being movable to an inoperative position spaced from the respective coupling lever.

9. An input mechanism as set forth in claim 8 wherein each of said slide elements has a toothed part, and a rod extending across all slide elements and being movable between a retracted position and an operative position engaging said toothed parts of said slide elements for accurately positioning and aligning said slide elements.

10. An input mechanism as set forth in claim 7 wherein each of said control elements is a pivotable blocking lever having at one end thereof said pin, and at the other end thereof a transverse projection cooperating with the respective coupling lever to pivot the respective coupling lever to said inoperative position while the respective actuator element moves to said normal home position.

11. An input mechanism as set forth in claim 10 and including a stationary blocking stop associated with the lowest order, and engaging the coupling lever associated with the lowest order during movement of the input actuator element of the lowest order to said normal home position to move the respective coupling lever to said inoperative position.

12. An input mechanism as set forth in claim 6 wherein each of said slide means includes a slide element mounted for movement in longitudinal direction between said digital positions and having said slot and a lever element pivotally mounted on said slide element, each of said slide elements having a set of recesses respectively associated with said digital positions; a rod extending across all slide elements and being movable between a retracted position and an operative position engaging one recess of each of said slide elements for accurately positioning and aligning said slide elements in various digital positions; a multiplier key movable to an actuated position for effecting operation of said input actuator elements; and linkage means connecting said multiplier key with said rod so that the same is moved to said retracted position when said multiplier key is moved to said actuated position.

13. An input mechanism as set forth in claim 12 wherein each of said lever elements is pivotable between an operative position cooperating with the respective coupling means and an inoperative position spaced from said coupling means, each of said lever elements having a set of recesses respectively associated with said digital positions of said slide means, each of said coupling means including a spring-loaded coupling member tending to engage one of said last-named recesses in said coupling position of said coupling means and in said operative position of the respective lever element; a cyclically movable operation control means activated by said multiplier key; and a guide member controlled by said operation control means to move said lever elements between said operative and inoperative positions thereof.

14. An input mechanism as set forth in claim 13 wherein said operation control means include oscillating cam means, and wherein said guide member is connected to and actuated by said cam means during each operational cycle of the machine, said guide member slidably guiding said slide elements and holding said rod in said retracted position when said lever elements are in operative positions.

15. An input mechanism as set forth in claim 14 and including operating means for moving said input actuator elements between said positions thereof, said operating means being driven from said cam means; restoring means shiftable between a first position and a second position and being connected to said multiplier key to move to said second position when said key is actuated, said restoring means being engaged and actuated by said operating means only in said second position to move to a restoring position, said restoring means including a member extending across said slide elements and engaging said slide elements to move said slide means to an initial cleared position when said restoring means in said second position is moved to said restoring position by said operating means.

16. An input mechanism as set forth in claim 15 and including arresting means for cyclically arresting said guide member in a position holding said lever elements in said inoperative positions, said restoring means operating said arresting means during movement to said restoring position to release said guide member and thereby said lever elements when said slide means are restored to initial positions.

17. In a calculating machine, in combination, a multiplier input mechanism for shortened multiplications and comprising a denominational series of digital input actuator elements respectively movable from a normal home position spaced a unit distance beyond zero position to a selected one of a set of digital positions 0–9 and restored to home position during an operational cycle of said elements and adapted to sense a pin carriage so as to assume said digital positions; a denominational series of digital slide means, each digital slide means being movable between a first group of digital positions associated with lower digits and a second group of digital positions associated with higher digits, each slide means having a first guide portion associated with said first group of positions and an offset second guide portion associated with second group of positions; a denominational series of spring-loaded coupling means respectively mounted on said input actuator elements for pivotal movement between an inoperative uncoupled position and a coupling position and tending to assume said coupling position, each coupling means in said coupling position connecting an input actuator element with the corresponding slide means during movement of the input actuator element in one direction so that during each operational cycle of said input actuator elements said slide means are shifted to successive digital positions corresponding to respective input actuator elements and a denominational series of pivotally mounted control elements, each control element cooperating with a coupling means of the same order, and having a portion slidably engaging said first guide portion of the slide means of the next lower order when the respective slide means is in a position of said first group and slidably engaging said second guide portion when the respective slide means is in a position of the second group so that each control element is moved to an operative position when the respective slide means is in a position of said first group and to an inoperative position when the respective slide means is in a position of said second group, each control element in said operative position engaging the corresponding coupling means during movement of the respective input actuator element from zero to home position for shifting said coupling means to said inoperative position of the same during movement of the respective input actuator element from zero to home position so that only upon introduction of the higher digits into any slide means the coupling means of the next higher order remains in said coupling position whereby during movement of the respective input actuator element to said home position, the slide means associated with the next higher order is shifted to a position representing the next higher digit instead of the digit sensed by the input actuator element associated therewith.

18. A mechanism as set forth in claim 17 including restoring means engaging said slide means and being movable to a restoring position for clearing said slide means; operating means for actuating said input actuator elements; and a multiplier key movable to an actuated position for effecting operation of said restoring means and of said operating means.

References Cited in the file of this patent

UNITED STATES PATENTS

| | | |
|---|---|---|
| 1,968,201 | Hamann | July 31, 1934 |
| 2,088,634 | Breitling | Aug. 3, 1937 |
| 2,374,333 | Crosman | Apr. 24, 1945 |
| 2,397,745 | Kiel | Apr. 2, 1946 |
| 2,611,539 | Torrell et al. | Sept. 23, 1952 |
| 2,886,238 | Plunkett | May 12, 1959 |

FOREIGN PATENTS

| | | |
|---|---|---|
| 509,747 | Great Britain | July 20, 1939 |